United States Patent Office 3,598,755
Patented Aug. 10, 1971

3,598,755
FOAM CONTROL AGENTS
John W. McBroom, Saddlebrook, N.J., and Barry B. Rein, Riverdale, N.Y., assignors to Continental Oil Company, Ponca City, Okla.
No Drawing. Filed July 5, 1968, Ser. No. 742,479
Int. Cl. B01d
U.S. Cl. 252—321                                   10 Claims

ABSTRACT OF THE DISCLOSURE

Foaming during acidulation of phosphate rock to produce wet-process phosphoric acid is greatly reduced by addition of a reagent comprising a mixture of alcohol of 16 or more carbons and a butylene oxide capped ethoylated alcohol made from an alcohol of 10 or more carbons.

This invention relates to reduction of foam during production of wet-process phosphoric acid. In one aspect, the invention relates to method and composition useful for reducing formation of foam during acidulation of phosphate rock with acid, especially sulfuric acid.

In the production of phosphoric acid by the so-called wet process, phosphatic values in the form of phosphate rock are digested with a mineral acid, normally sulfuric acid. Because of the liberation of carbon dioxide and other gasses, and by the nature of the reaction, a rather stable foam is generated. If uncontrolled, this foam can lead to severe processing difficulties and even, in extreme cases, to shut-down of the process. The severity of the foam depends on the type of phosphate rock, the processing rate, the type of anti-foam reagent used, and other variables.

Accordingly, it is an object of this invention to reduce the amount of foam produced during acid digestion of phosphate rock, and a novel method and composition for foam control are accordingly provided.

It has now been discovered that addition of an anti-foam reagent to the digestion mixture, the reagent comprising a mixture of one or more alcohols of 16 or more carbon atoms per molecule and one or more butylene oxide capped ethoxylated alcohols derived from alcohols of 10 or more carbon atoms per molecule, results in greatly reduced foam.

More specifically, the foam inhibitor of this invention comprises a mixture of an alcohol and an ethoxylated alcohol in a ratio between about 70:30 and about 90:10, calculated by weight. Within this range, the high end, e.g. from about 80:20 to about 90:10, is preferable.

The alcohol component can comprise a single alcohol or a mixture of alcohols whose average size falls within the preferred range, viz from about 16 to about 30 carbon atoms per molecule, and preferably from about 16 to about 22 carbon atoms per molecule. The alcohol component is most preferably of the straight-chain primary type; it has been discovered that branched-chain and secondary and tertiary alcohols are much less effective than straight-chain primary alcohols in the inventive composition. Suitable alcohols include but are not limited to n-hexadecanol, n-octadecanol, n-nonadecanol, n-eicosanol, and n-triacontanol.

The butylene oxide capped ethoxylated alcohol component can similarly be based on a single alcohol or a mixture of alcohols whose average size falls within the preferred range, viz from about 8 to 14 carbon atoms per molecule, and preferably from about 10 to 12. These correspond to the general formula:

$$R(OCH_2CH_2)_nOC_4H_8OH$$

where R is a $C_8$–$C_{14}$ alkyl group and $n$ indicates a range of integers representing the statistical distribution of oxyethylene units obtained by condensing from 4 to 10 moles of ethylene oxide with a mole of the compound providing said hydrocarbon groups, namely, a higher aliphatic mono-alcohol. The compounds having replaceable hydrogen atoms useful to prepare the base ethoxylates of this invention are the various detergent grade aliphatic mono-alcohols. The preferred mono-alcohols are the linear alcohols such as exemplified by the primary alcohols obtained in accordance with the Ziegler synthesis method of the secondary alcohols prepared by the OXO process. Particularly desirable alcohols are the linear primary alcohols. Broadly inclusive of the latter, as well as the linear secondary alcohols, are those containing from 8 to 14 carbon atoms. Especially useful alcohols within this range are the $C_{10}$–$C_{12}$ alcohols and mixtures thereof.

Ethoxylates of the foregoing compounds containing a replaceable hydrogen atom can be prepared by conventional methods. Either acid or base catalysis is applicable. Base catalysis, however, is preferred. Exemplary of suitable bases is sodium hydroxide. Boron trifluoride is the preferred acid catalyst for effecting condensation.

The general procedure for carrying out the condensation reaction involves adding the requisite amount of ethylene oxide to the alcohol together with the catalyst selected and heating the reactants to an elevated temperature under autogenous pressure. The ethoxylation or condensation reaction can be carried out in a temperature range of from about 320 to 380° F. The preferred temperature range is from about 340 to 360° F. The foregoing temperature ranges are applicable for the preferred catalyst, specifically, sodium hydroxide. When using an acid catalyst, such as boron trifluoride, a lower temperature is to be observed. A range of from about 175 to 220° F. is suitable for such catalysis.

The amount of ethylene oxide to be reacted with the mono-alcohol is primarily dependent upon the molecular weight thereof. As the molecular weight of the hydrophobe portion increases, the use of correspondingly greater amounts of ethylene oxide is the customary practice. For the broad range of alcohols contemplated herein the corresponding amounts of ethylene oxide range from 4 to 10 moles per mole of the alcohol. An ethylene oxide range of from 5 to 9 moles per mole of the preferred $C_{10}$ to $C_{12}$ alcohols is applicable and most preferably is chosen to give about 59–61 weight percent EO.

In accordance with this invention the ethoxylates described hereinabove are then reacted with butylene oxide in a manner whereby a substantial portion of the ethoxylated compounds are terminated with a hydroxy butoxy grouping. An applicable amount of butylene oxide for achieving such capping is from 0.5 to 1.5 moles of butylene oxide per mole of the ethoxylate. The preferred compositions are those obtained by further condensing the ethoxylated product with about 0.8 to about 1.0 mole of butylene oxide. Again, either base or acid catalysis can be used to achieve capping of the ethoxylate. A base such as sodium hydroxide is preferred from the standpoint of convenient processing. However, the use of an acid catalyst such as boron trifluoride for this purpose results in a product having somewhat better physical appearance than those capped materials prepared using base catalysis for the capping step. The respective ranges of temperatures, including the preferred ranges discussed hereinabove in connection with preparing the ethoxylate, are precisely applicable in achieving capping thereof with the butylene oxide. The various butylene oxides can be used to prepare the nonionics of this detergent. 1,2-butylene oxide is the preferred capping material.

The two components of the present foam depressant are both normally solid at room temperatures, as is their mixture. They can be solubilized for use as a liquid at low ambient temperatures, e.g. at 60° F., by use of a suitable solvent or by esterifying with e.g. acetic acid. However, it is often convenient to ship the reagent as a solid and melt it at relatively low temperatures, e.g. 75 to 100° F. or more, depending on the components, for use as a liquid.

The foam depressant compositions of the present invention have thus far been mentioned as effective in reducing foam during the sulfuric acid acidulation of phosphate rock, because this process is currently conventional. However, the inventive compositions are also highly effective in defoaming during acidulation of phosphate rock with other mineral acids, such as nitric and hydrochloric acids.

The amount of defoamer required in a given instance is readily determinable by experimentation, e.g. by visual observation, and as stated, will vary dependent upon several factors.

The invention will now be illustrated by the following examples; in these examples, the raw or feed acid varies from one example to the next, but is constant throughout a given example. The best commercially available antifoam agent prior to the present invention is used as a control in the examples. This material is known as Arizona SAA302, and is a blend of about 35 weight percent oleic acid, about 35 weight percent linoleic acid, and the balance oleic acid ethoxylate.

EXAMPLE I

A preferred composition according to the present invention was formulated, and comprised a blend of about 90 weight percent alcohols (a blend of approximately equal weights of 16 and 18 carbon straight-chain 1-alcohols) and about 10 weight percent of butylene oxide capped ethoxylated alcohols (a blend of about equal moles of 10 and 12 carbon straight-chain 1-alcohols, ethoxylated to about 60 weight percent EO and then capped with about 0.94 mole butylene oxide per mole of ethoxylated alcohol). This material was compared to the best commercially available anti-foam agent, i.e. Arizona SAA302, by addition to the rock digestion reactor of a commercial wet-process phosphoric acid plant during its regular operation. During the test periods, consumption of the anti-foam agent of this invention was 2931 lb. during treatment of 1981.84 tons of phosphate rock, or 1.48 lb. anti-foam per ton of rock. Consumption of Arizona 302 to maintain the same degree of de-foaming was 5040 lb. defoamer per 3042.11 tons of rock, or 1.66 lb. per ton.

EXAMPLE II

In this test, a simulated digestion reactor was used. Calculated quantities of sulfuric acid and phosphate rock were continuously added to the stirred reactor, which was first charged with "filter" acid (a commercial phosphoric acid of about 30 weight percent $P_2O_5$), over a 2 hour period. Defoamer is added whenever the surface of the mixture is covered with foam so that additional rock will not reach the surface of the liquid medium.

| Product: | Defoamer usage, lb./t. |
|---|---|
| Arizona 302 | 9.9, 10.3, 13.7 (3 runs) |
| Enjay 7–9571 [1] | 19.3 |
| Swift 70 [1] | 19.6 |
| 90% 1618, 10% 1218–60 | 16.1 |
| 90% 1618, 10% 1012–60+0.88 BO [2] | 4.9 |
| 90% 1618, 10% 1012–60 +0.94 BO₂ | 6.3, 8.0 (2 runs) |
| 90%, 1618, 10% 1012–60+60 BO | (3) |
| 90% 1618, 10% 1012–60+1.0 BO at 185° F., aged 14 days | 6.9 |
| 90% 1618, 10% 1012–60+1.05 BO | 7.9 |
| 95% 1618, 5% 1012–60+1.0 BO | 9.2 |

[1] A tall oil derivative.
[2] "1618" refers to the alcohol blend described in Example 1, "1012–60" and "1218–60" refer to a blend of 10 and 12 carbon and a blend of 12, 14, 16 and 18 carbon alcohols respectively, each ethoxylated to about 60 weight percent, and "0.88 BO" refers to 0.88 mole butylene oxide per mole ethoxylated alcohol.
[3] 5.5, 5.8, 6.0, 6.1, 6.9, 7.9, 7.9, 8.2 (8 runs).

Although this invention has been described with respect to particular embodiments thereof, it is not to be so limited, as changes and modifications may be made therein which are within the spirit and scope of the invention as defined by the appended claims.

What is claimed is:

1. A foam reducing composition comprised essentially of:
   (a) a straight-chain primary alcohol containing from about 16 to 30 carbon atoms per molecule, and
   (b) a compound of the formula

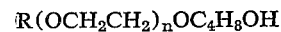
   $$R(OCH_2CH_2)_nOC_4H_8OH$$

where R is a $C_8$–$C_{14}$ alkyl group and $n$ is from 4 to 10;
   the ratio of component (a) to component (b) being from about 7:3 to about 9:1.

2. The composition of claim 1 wherein component (a) contains from about 16 to about 22 carbon atoms per molecule average.

3. The composition of claim 2 wherein R is a straight-chain primary alkyl containing from about 10 to about 12 carbon atoms per molecule average.

4. The composition of claim 3 wherein $n$ is from about 5 to about 9.

5. The composition of claim 4 wherein $n$ is chosen to give an ethylene oxide content of about 60 weight percent.

6. In the method of producing phosphoric acid wherein a phosphatic mineral is digestesd with a mineral acid, the improvement which comprises adding to the digestion step an effective amount of a foam-inhibiting composition comprised essentially of:
   (a) a straight-chain primary alcohol of from about 16 to about 30 carbon atoms per molecule, and
   (b) a compound of the formula

   $$R(OCH_2CH_2)_nOC_4H_8OH$$

where R is a $C_8$–$C_{14}$ alkyl group and $n$ is from 4 to 10;
   the ratio of component (a) to component (b) being from about 7:3 to about 9:1.

7. The method of claim 6 wherein said mineral acid is sulfuric acid.

8. The method of claim 7 wherein component (a) contains from about 16 to about 22 carbon atoms per molecule, and wherein R of a component (b) is a straight-chain primary alkyl containing from about 10 to about 12 carbon atoms.

9. The method of claim 8 wherein $n$ is chosen to give an ethylene oxide content of about 60 weight percent.

10. The method of claim 9 wherein said composition is added in an amount between about 4.9 and about 9.2 pounds per ton of said phosphatic mineral.

References Cited

UNITED STATES PATENTS

| 2,085,709 | 6/1937 | Steibelt | 252—358 |
| 3,086,944 | 4/1963 | Wedell | 252—358 |
| 3,437,437 | 4/1969 | Dorwart III | 23—165 |

JOHN D. WELSH, Primary Examiner

U.S. Cl. X.R.

23—165; 252—358

PO-1050
(5/69)

UNITED STATES PATENT OFFICE
CERTIFICATE OF CORRECTION

Patent No. 3,598,755      Dated August 10, 1971

Inventor(s) John W. McBroom and Barry B. Rein

It is certified that error appears in the above-identified patent and that said Letters Patent are hereby corrected as shown below:

Column 4, line 18, "+0.94 $BO_2$" should be ---+0.94 BO---.
Column 4, line 19, "90%, 1618, 10% 1012-60+60 BO" should be ---90%, 1618, 10% 1012-60+1.0 BO---.

Signed and sealed this 16th day of May 1972.

(SEAL)
Attest:

EDWARD M. FLETCHER, JR.
Attesting Officer

ROBERT GOTTSCHALK
Commissioner of Patents